US012656212B2

(12) United States Patent
Aoki

(10) Patent No.: US 12,656,212 B2
(45) Date of Patent: Jun. 16, 2026

(54) FLUTTER WIND TUNNEL TEST MODEL AND METHOD OF PRODUCING FLUTTER WIND TUNNEL TEST MODEL

(71) Applicant: SUBARU CORPORATION, Tokyo (JP)

(72) Inventor: Kazuyuki Aoki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 555 days.

(21) Appl. No.: 18/139,468

(22) Filed: Apr. 26, 2023

(65) Prior Publication Data

US 2023/0366778 A1 Nov. 16, 2023

(30) Foreign Application Priority Data

May 16, 2022 (JP) ................................. 2022-080175

(51) Int. Cl.
*G01M 9/08* (2006.01)
*B64F 5/60* (2017.01)

(52) U.S. Cl.
CPC ................. *G01M 9/08* (2013.01); *B64F 5/60* (2017.01)

(58) Field of Classification Search
None
See application file for complete search history.

(56) References Cited

U.S. PATENT DOCUMENTS

| | | | |
|---|---|---|---|
| 6,553,823 B2 | 4/2003 | Omotani et al. | |
| 10,155,373 B2 * | 12/2018 | Nino ......................... | B64C 3/26 |
| 10,633,976 B2 | 4/2020 | Nissen et al. | |
| 11,364,989 B2 | 6/2022 | Nomura et al. | |

(Continued)

FOREIGN PATENT DOCUMENTS

| | | |
|---|---|---|
| CN | 112611538 A | 4/2021 |
| JP | 2002-206987 A | 7/2002 |
| JP | 2018-146363 A | 9/2018 |

(Continued)

OTHER PUBLICATIONS

Extended European Search Report issued Oct. 13, 2023 for European Patent Application No. 23168411.9-1001.

(Continued)

*Primary Examiner* — Peter J Macchiarolo
*Assistant Examiner* — Jermaine L Jenkins
(74) *Attorney, Agent, or Firm* — McGinn IP Law Group, PLLC

(57) ABSTRACT

A flutter wind tunnel test model simulates a shape and vibration property of an aircraft part, for a flutter wind tunnel test of the aircraft part. The model at least partially has non-solid structure having branched clearances inside. A volume of a portion, other than the clearances, of the non-solid structure, per unit volume is defined by density. A method of producing a flutter wind tunnel test model simulating a shape and vibration property of an aircraft part, for a flutter wind tunnel test of the aircraft part, includes: shaping non-solid structure with a three-dimensional printer and composing at least a part of the flutter wind tunnel test model using the non-solid structure. The non-solid structure has branched clearances inside. A volume of a portion, other than the clearances, of the non-solid structure, per unit volume is defined by density.

20 Claims, 6 Drawing Sheets

(56)        References Cited

U.S. PATENT DOCUMENTS 12,454,031 B2 *  10/2025  Yin  ........................ B23P 23/04

FOREIGN PATENT DOCUMENTS

| JP | 2019-069684 A | 5/2019 |
| JP | 2019-199051 A | 11/2019 |

OTHER PUBLICATIONS

European Office Action for European Application No. 23168411.9 dated Feb. 24, 2025.
Japanese Office Action dated Jan. 23, 2026 in Japanese Patent Application No. 2022-080175 with JPO machine English translation.

* cited by examiner

B

C-C

D-D

FLUTTER WIND TUNNEL TEST MODEL AND METHOD OF PRODUCING FLUTTER WIND TUNNEL TEST MODEL

CROSS REFERENCES TO RELATED APPLICATIONS

This application is based upon and claims the benefit of priority from Japanese Patent Application No. 2022-080175, filed on May 16, 2022; the entire contents of which are incorporated herein by reference.

FIELD

Implementations described herein relate generally to a flutter wind tunnel test model and a method of producing a flutter wind tunnel test model.

BACKGROUND

An air flow causes a periodic self-excited vibration on the wings and body of an aircraft during flight. The phenomenon that vibration arises in an aircraft during flight due to an air current is called the flutter. In order to check an aspect of flutter arising in each part, such as a main wing, of an aircraft, wind tunnel tests with models are performed.

It is important to design a flutter wind tunnel test model used for a flutter wind tunnel test so that the flutter wind tunnel test model may deform due to flutter arising in a wind tunnel similarly to an aircraft part, such as a main wing, to be simulated. Therefore, the flutter wind tunnel test model is designed based on the stiffness and mass distribution of an aircraft part to be simulated so that the vibration properties including the natural frequency and vibration modes may become equal to those of the aircraft part. The conventional flutter wind tunnel test model is produced by molding a wing shape with flexible resin on a metal plate using a metal mold.

Note that, examples of a known wind tunnel test using a model simulating an aircraft part include a wind tunnel test for measuring the pressure distribution on the surface of a main wing or the like, and an icing wind tunnel test for investigating behavior of icing on a main wing or the like (for example, refer to Japanese Patent Application Publication JP 2018-146363A and Japanese Patent Application Publication JP 2002-206987A).

An object of the present invention is to reduce the manufacturing cost of a flutter wind tunnel test model.

SUMMARY OF THE INVENTION

In general, according to one implementation, a flutter wind tunnel test model simulates a shape and vibration property of an aircraft part, for a flutter wind tunnel test of the aircraft part. The model at least partially has non-solid structure having branched clearances inside. A volume of a portion, other than the clearances, of the non-solid structure, per unit volume is defined by density.

Further, according to one implementation, a method of producing a flutter wind tunnel test model simulating a shape and vibration property of an aircraft part, for a flutter wind tunnel test of the aircraft part, includes: shaping non-solid structure with a three-dimensional printer and composing at least a part of the flutter wind tunnel test model using the non-solid structure. The non-solid structure has branched clearances inside. A volume of a portion, other than the clearances, of the non-solid structure, per unit volume is defined by density.

DETAILED DESCRIPTION

A flutter wind tunnel test model and a method of producing a flutter wind tunnel test model according to implementations of the present invention will be described with reference to accompanying drawings.

(Structure and Function of a Flutter Wind Tunnel Test Model)

Figure 1:
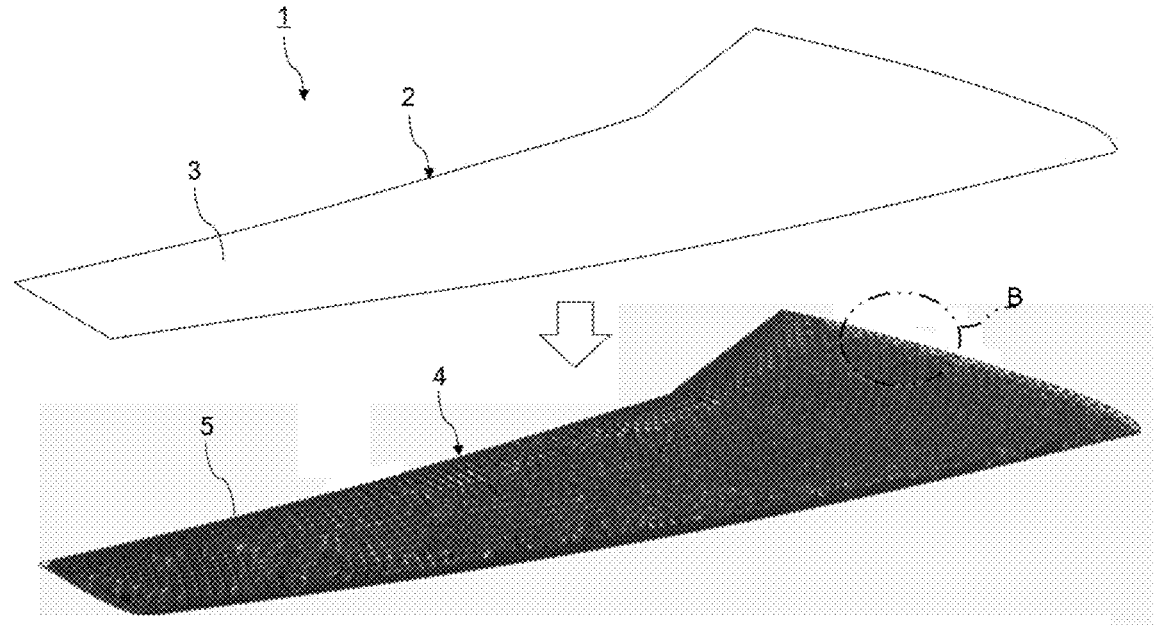
FIG. 1 is an exploded perspective view for explaining an example of structure of a flutter wind tunnel test model according to an implementation of the present invention.
Figure 2:
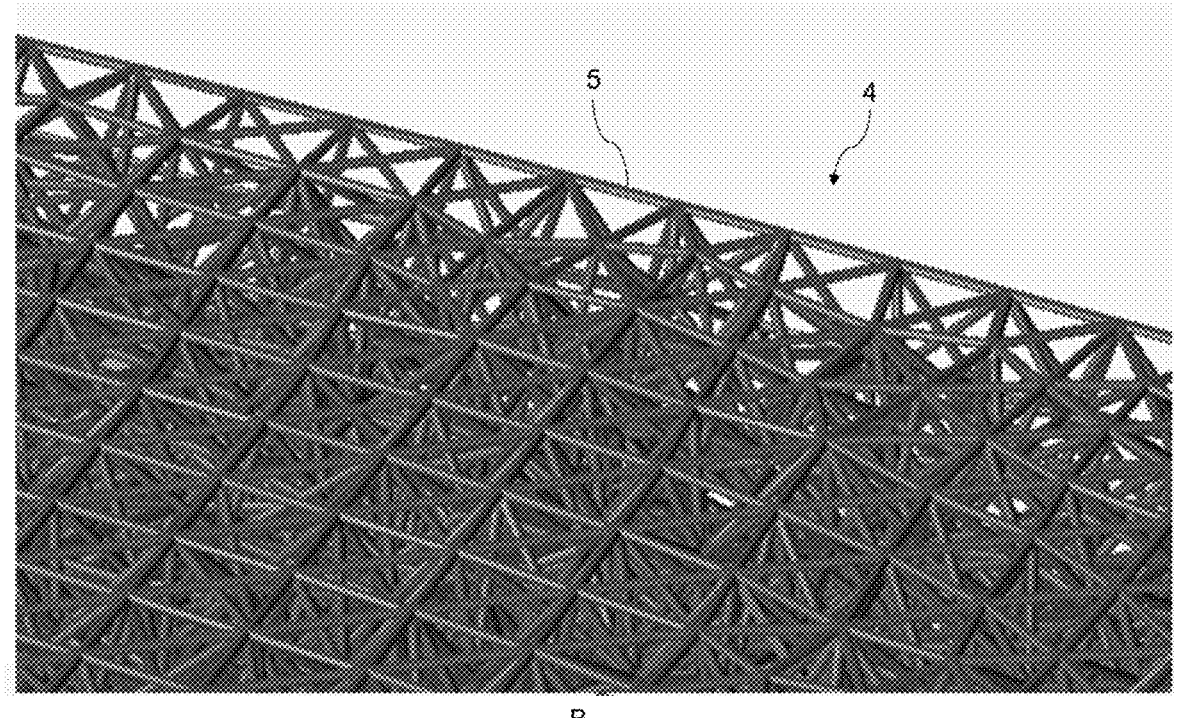
FIG. 2 is a partial enlarged perspective view in the vicinity of a portion B of the flutter wind tunnel test model shows in FIG. 1.
Figure 3:
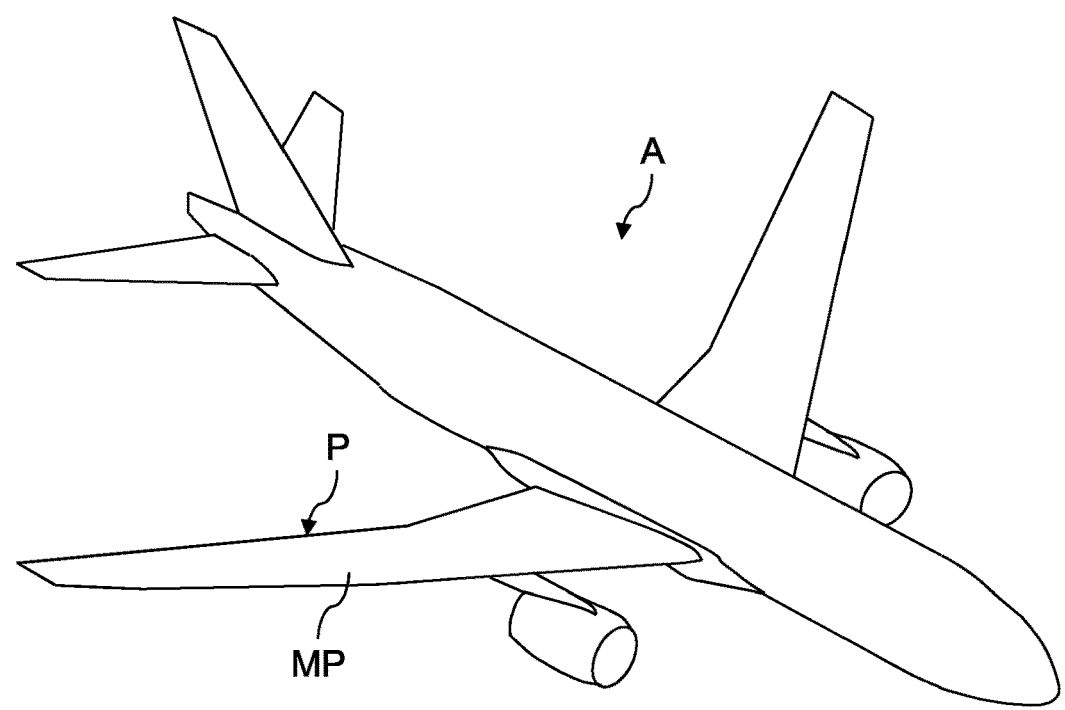
FIG. 3 is a schematic perspective view of an aircraft including main wings each of which is an example of aircraft part simulated by the flutter wind tunnel test model shown in FIG. 1.

FIG. 1 is an exploded perspective view for explaining an example of structure of a flutter wind tunnel test model 1 according to an implementation of the present invention. FIG. 2 is a partial enlarged perspective view in the vicinity of a portion B of the flutter wind tunnel test model 1 shows in FIG. 1. FIG. 3 is a schematic perspective view of an aircraft A including main wings MW each of which is an example of aircraft part P simulated by the flutter wind tunnel test model 1 shown in FIG. 1.

The flutter wind tunnel test model 1 shown in FIG. 1 is a model for a flutter wind tunnel test of an aircraft part P. Specifically, the flutter wind tunnel test model 1 is disposed and used in a wind tunnel for a flutter test, and deformation of the flutter wind tunnel test model 1 in a case where flutter has arisen in the flutter wind tunnel test model 1 due to air flows in the wind tunnel is observed.

Accordingly, the flutter wind tunnel test model 1 simulates the shape of an aircraft part P as well as the vibration properties of the aircraft part P. FIG. 1 shows an example of case where the flutter wind tunnel test model 1 simulates a main wing MW of an aircraft A as shown in FIG. 3. As a matter of course, not only a main wing MW but an aircraft part P, such as a tail plane or a fuselage, may be simulated by the flutter wind tunnel test model 1.

FIG. 1 shows the flutter wind tunnel test model 1 before at least one plate member 2 simulating a skin panel of the main wing MW is attached. The plate member 2 has solid structure 3 so that the plate member 2 may receive aerodynamic force in a wind tunnel similarly to the main wing MW. That is, the plate member 2 has a curved surface having no holes similarly to the skin panel of the main wing MW. Accordingly, the plate member 2 receives aerodynamic force and thereby deforms in the wind tunnel.

Meanwhile, an inside portion 4 covered by the plate member 2 or the plate members has non-solid structure 5. More specifically, the inside portion 4 of the flutter wind tunnel test model 1 has the non-solid structure 5 having uniformly branched clearances inside. Typical examples of the non-solid structure 5 having the uniformly branched clearances inside include lattice structure and porous structure. The lattice structure has periodically located ramified grids. Meanwhile, the porous structure is sponge-like and has many vacancies inside.

The non-solid structure 5 may include composite structure. Therefore, the non-solid structure 5 may be at least one of lattice structure and porous structure, and another structure may be also combined. FIG. 1 shows an example of case where the non-solid structure 5 consists of only lattice structure, as shown in the enlarged view of FIG. 3.

In the uniform non-solid structure 5 typified by lattice structure and porous structure, the volume of the portion, except for the clearances, per unit volume is defined by the density. Therefore, at least one of the mass distribution and the stiffness distribution of the flutter wind tunnel test model 1 can be adjusted freely by appropriately determining the density distribution of the inside portion 4 having the non-solid structure 5.

As a concrete example, when the non-solid structure 5 consists of lattice structure, the density distribution of the inside portion 4 having the non-solid structure 5 can be adjusted by setting the density of the grids and/or the thickness of the rod-like members composing the grids as at least one parameter, and changing the set at least one parameter at each position. Meanwhile, also when the non-solid structure 5 consists of porous structure, the density distribution of the inside portion 4 having the non-solid structure 5 can be adjusted by setting sizes of the vacancies, the density of the vacancies and the like as at least one parameter, and changing the set at least one parameter.

At least one of the mass distribution and the stiffness distribution of the flutter wind tunnel test model 1 can also be adjusted by appropriately selecting material of the inside portion 4 having the non-solid structure 5 in addition to the adjustment of the density of the inside portion 4 having the non-solid structure 5. The material of the inside portion 4 having the non-solid structure 5 may be at least one of metal and resin. As a matter of course, the inside portion 4 having the non-solid structure 5 may be made of different materials according to positions.

Note that, although main materials of the aircraft part P are a metal and an FRP (fiber reinforced plastics), each having the specific gravity larger than that of resin, a typical main wing MW serves as a hollow fuel tank reinforced by reinforced members, such as ribs, spars and stringers, while other portions including the fuselage each has hollow structure. Therefore, the mass distribution and stiffness distribution of the aircraft part P can be simulated by the non-solid structure 5 made of only resin as long as the density of the non-solid structure 5 is made sufficiently large.

Similarly, the plate member 2 having the solid structure 3 may also be made of at least one of metal and resin. Therefore, when the material of the plate member 2 or the plate members 2 is made same as the material of the inside portion 4, the manufacturing cost of the flutter wind tunnel test model 1 can be reduced. Conversely, the material of the plate member 2 or the plate members 2 may be made different from the material of the inside portion 4 in order to appropriately adjust the mass distribution and stiffness distribution of the flutter wind tunnel test model 1.

Moreover, in order to adjust the mass distribution and stiffness distribution of the flutter wind tunnel test model 1, a part of the inside portion 4 may be made to have the non-solid structure 5 while the other part of the inside portion 4 may be made to have solid structure, instead of making the whole inside portion 4 have the non-solid structure 5 as shown in FIG. 1. In that case, the plate member 2 or the plate members 2 may be integrated with the inside part having the solid structure.

In other words, at least a part of the flutter wind tunnel test model 1 can be made to have the non-solid structure 5 while each part of the flutter wind tunnel test model 1 simulating at least a portion forming a surface, such as the upper surface, the leading edge, the trailing edge, the lower surface or the like of the main wing MW, which receives aerodynamic force, out of an aircraft part P can be made to have the solid structure 3 having no clearances so that each part of the flutter wind tunnel test model 1 may receive aerodynamic force in a flutter wind tunnel test.

Even in that case, both the solid structure 3 and the non-solid structure 5 may be made of resin or metal. Conversely, the non-solid structure 5 made of metal or resin may be disposed inside the solid structure 3 made of resin or metal. Alternatively, a part of the solid structure 3 may be made of resin while the remaining part of the solid structure 3 may be made of metal. Meanwhile, a part of the non-solid structure 5 may be made of resin while the remaining part of the non-solid structure 5 may be made of metal.

When the flutter wind tunnel test model 1 is produced by assembling parts, each two parts can be coupled to each other by a desired coupling method, such as use of an adhesive, interference fit or screw clamp, whether the solid structure 3 and the non-solid structure 5 are made of a same material or different materials.

(A Method of Producing a Flutter Wind Tunnel Test Model)

Next, a method of producing the flutter wind tunnel test model 1 and an example of more detailed structure of the flutter wind tunnel test model 1 to be produced will be described.

Figure 4:
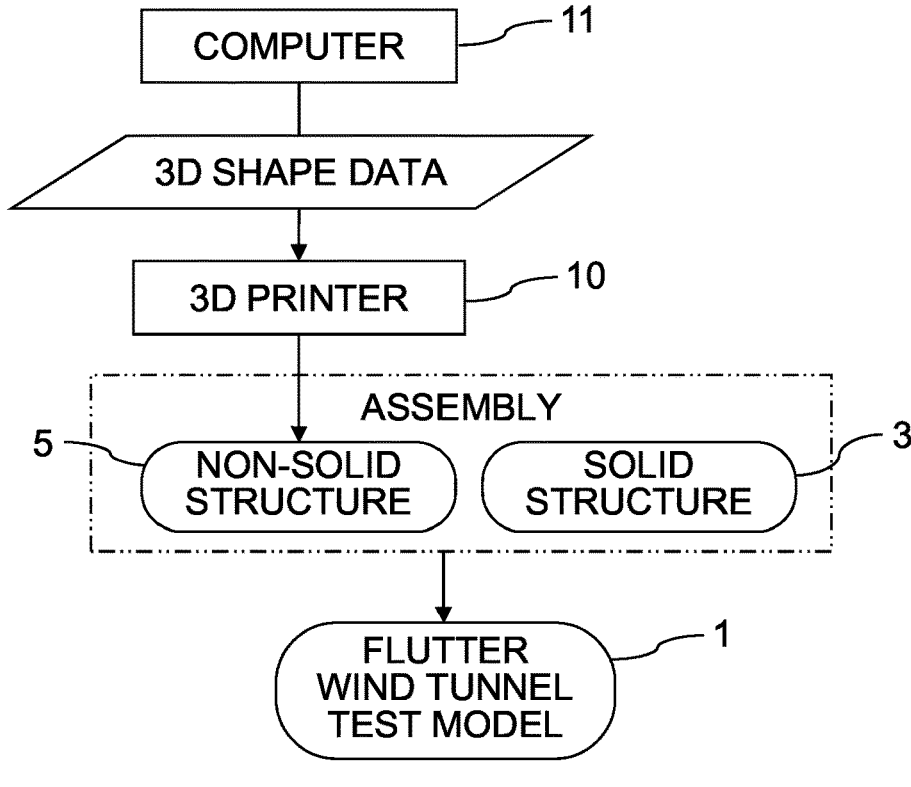
FIG. 4 is a chart for explaining an example of method of producing the flutter wind tunnel test model shown in FIG. 1.

FIG. 4 is a chart for explaining an example of method of producing the flutter wind tunnel test model 1 shown in FIG. 1.

As shown in FIG. 4, the inside portion 4 having the non-solid structure 5, such as lattice structure and/or porous structure, out of the flutter wind tunnel test model 1 can be shaped with a 3D (three-dimensional) printer (laminating shaping apparatus) 10. 3D shape data which should be output to the 3D printer 10 can be created using a computer 11.

When the aircraft A is a supersonic aircraft, the size of the flutter wind tunnel test model 1 simulating a typical aircraft part P, such as the main wing MW, is about 30 cm to 60 cm. Meanwhile, the aircraft A is a subsonic aircraft, the size of the flutter wind tunnel test model 1 is about 1 m to 2 m.

Accordingly, at least the inside portion 4 having the non-solid structure 5 can be produced using the 3D printer 10 which can shape the flutter wind tunnel test model 1 of the size to be produced.

The 3D printer 10 can also shape solid structure. Therefore, not only the non-solid structure 5 but the solid structure 3 can be integrally shaped by the 3D printer 10 when the inside portion 4 having the non-solid structure 5 is made of material same as that of the plate member 2 or the plate members 2 having the solid structure 3. This applies to a case where a part of the inside portion 4 has solid structure.

Commercially available examples of the 3D printer 10 include an apparatus using a material consisting of a resin as well as an apparatus using a material consisting of a metal. Specifically, the 3D printer 10 typified by an FDM (fused deposition modeling) system, an optical shaping system and an ink jet system can shape a solid having a complicated shape using a material consisting of a thermoplastic resin, such as ABS resin, PLA resin, polypropylene resin, acrylic resin or polyethylene terephthalate (PET), a thermosetting resin, such as epoxy-based resin or acrylate-based resin, or a metal, such as iron-based metal or aluminum.

When the size of the flutter wind tunnel test model 1 is too large to be shaped with the 3D printer 10 at a time, the shaping may be divided. Namely, respective portions of the flutter wind tunnel test model 1 may be shaped using a common 3D printer 10 or 3D printers 10. Also, when the non-solid structure 5 of the flutter wind tunnel test model 1 is shaped with combining two or more different materials with each other, the shaping can be divided by use of two or more 3D printers 10. Namely, respective portions of the non-solid structure 5 can be shaped using the 3D printers 10 according to the materials.

When two or more parts of the non-solid structure 5 are separately shaped, the flutter wind tunnel test model 1 can be produced by assembling the shaped parts each having the non-solid structure 5. Moreover, when at least a part of the solid structure 3 is not shaped with the 3D printer 10, the flutter wind tunnel test model 1 can be produced by assembling at least one shaped part having the non-solid structure 5 and at least one part, which has not been produced by shaping, having the solid structure 3. As each of a method of coupling a shaped part with another shaped part, a method of coupling a shaped part with a part which has not been produced by shaping, and a method of coupling parts, which have not been produced by shaping, with each other, a desired method, such as use of an adhesive, interference fit or screw clamp, can be adopted.

As a typical concrete example, when the flutter wind tunnel test model 1 having the structure that the non-solid structure 5 is covered with the plate member 2 or the plate members 2 is to be produced as exemplified by FIG. 1, the flutter wind tunnel test model 1 can be produced by shaping the non-solid structure 5 made of resin with the 3D printer 10, and subsequently bonding the shaped non-solid structure 5 with the metal plate member 2 or the metal plate members 2 having the solid structure 3 with an adhesive as exemplified by FIG. 4.

Figure 5:
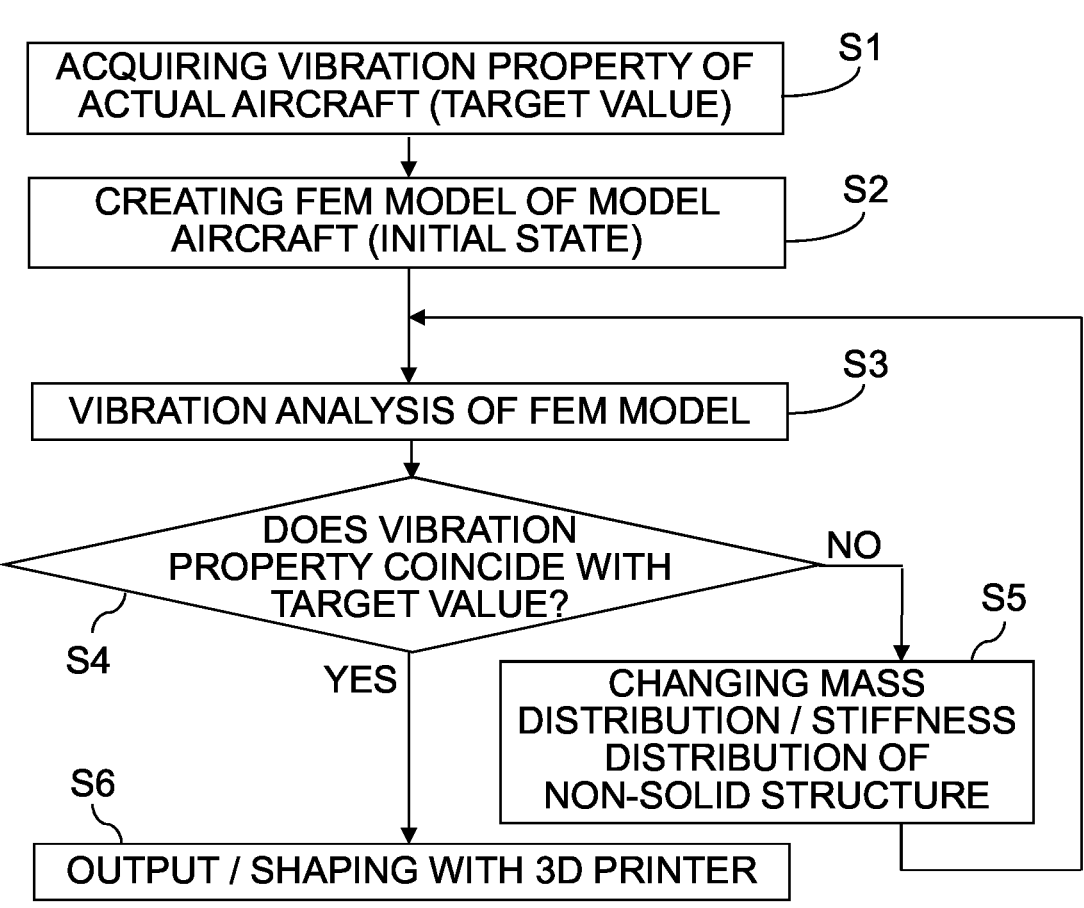
FIG. 5 is a flow chart showing an example of method of creating 3D shape data to be output to the 3D printer shown in FIG. 4.

FIG. 5 is a flow chart showing an example of method of creating 3D shape data to be output to the 3D printer 10 shown in FIG. 4.

The 3D shape data to be output to the 3D printer 10, i.e, the information for specifying the outline of at least the inside portion 4 having the non-solid structure 5 can be created by the computer 11, as mentioned above. Note that, each simple calculation and/or determination other than a complicated calculation, such as a vibration analysis, may be performed by an operator with operating the computer 11 or without utilizing the computer 11.

First, in step S1, vibration properties including the natural frequency and at least one vibration mode shape of the actual aircraft part P, such as the main wing MW, simulated by the flutter wind tunnel test model 1 are obtained as target values. The vibration properties of the actual aircraft part P can be calculated by a vibration analysis simulation using dedicated vibration analysis software. Note that, a vibration test using the actual aircraft part P may be actually performed in combination.

Meanwhile, in step S2, an FEM (finite element method) analytic model of the flutter wind tunnel test model 1 in which the non-solid structure 5 has been set to the initial state is created.

Next, in step S3, the vibration analysis is performed for the FEM analytic model of the flutter wind tunnel test model 1 under the FEM. Thereby, the vibration properties of the FEM analytic model can be obtained.

Next, in step S4, the vibration properties of the FEM analytic model are compared with the vibration properties of the actual aircraft part P. Specifically, it is determined whether it can be considered that the natural frequency and the vibration mode shape of the FEM analytic model coincide with the natural frequency and the vibration mode shape of the actual aircraft part P. In other words, it is determined whether each of deviation quantities, such as differences or ratios, of the natural frequency and the vibration mode shape of the FEM analytic model from the natural frequency and the vibration mode shape of the actual aircraft part P falls within an acceptable range.

Then, when it has been determined that the degree of coincidence of the vibration properties of the FEM analytic model to the vibration properties of the actual aircraft part P is insufficient, at least one of the mass distribution and the stiffness distribution of the non-solid structure 5 defined in the FEM analytic model is changed in step S5.

The mass distribution of the non-solid structure 5 can be changed by altering at least one parameter of the FEM analytic model representing a type of structural pattern of the non-solid structure 5, density of the non-solid structure 5 and the like as well as disposing at least one weight at various positions. Meanwhile, the stiffness distribution of the non-solid structure 5 can be changed by altering a parameter of the FEM analytic model representing a material of the non-solid structure 5 as well as disposing at least one member, having stiffness higher than that of the material of the non-solid structure 5, at various positions.

Figure 6:
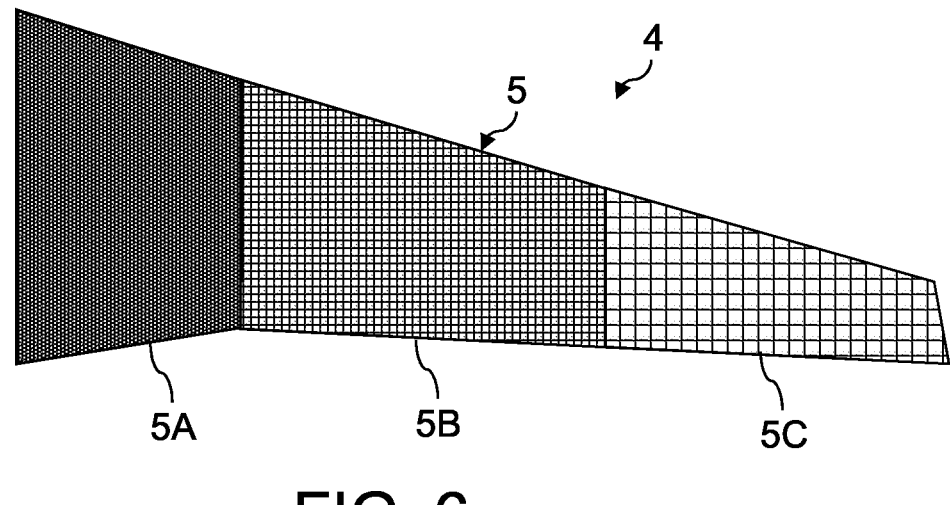
FIG. 6 shows an example of the flutter wind tunnel test model having the non-solid structure whose density is partially changed.

FIG. 6 shows an example of the flutter wind tunnel test model 1 having the non-solid structure 5 whose density is partially changed.

FIG. 6 shows a state where the plate members 2 simulating the skin panels of the main wing MW of the aircraft A have been detached from the flutter wind tunnel test model 1 simulating the main wing MW. That is, FIG. 6 shows a state where the non-solid structure 5 of the flutter wind tunnel test model 1 has been exposed. The density of the mesh in FIG. 6 expresses the largeness of the density of the non-solid structure 5.

As exemplified by FIG. 6, according to the actual mass distribution of the main wing MW, the density of the non-solid structure 5 simulating the inside of the main wing MW can be gradually decreased as the distance from the fuselage increases. In the example shown in FIG. 6, the non-solid structure 5 consists of three portions 5A, 5B, and 5C whose densities differ from each other. More specifically, the portion 5A has the maximum density, the portion 5B has the middle density, and the portion 5C has the minimum density. As a matter of course, the non-solid structure 5 may be divided into four or more portions whose densities differ from each other.

As described above, the density of the non-solid structure 5 can be partially changed so as to be non-uniform. In this case, different mass distributions and stiffness distributions according to positions can be given to the flutter wind tunnel test model 1 even when the non-solid structure 5 is shaped using a same material. Specifically, the portion 5A having the relatively large density has relatively large stiffness and mass while the portion 5C having the relatively small density has relatively small stiffness and mass.

Note that, different materials may be used for the portions 5A, 5B, and 5C of the non-solid structure 5 whose densities differ from each other. That is, materials used for the portions 5A, 5B, and 5C of the non-solid structure 5 whose densities differ from each other may be set to alterable parameters.

Figure 7:
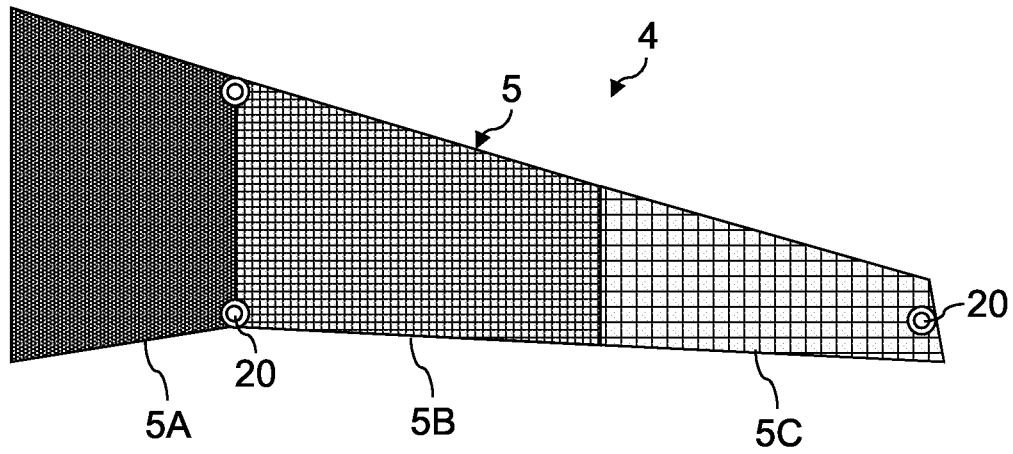
FIG. 7 shows an example of the flutter wind tunnel test model inside which columnar weights are disposed.
Figure 8:
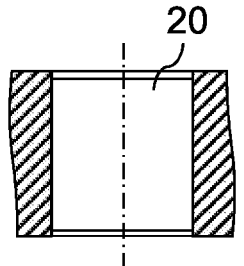
FIG. 8 is an enlarged longitudinal sectional view of the weight shown in FIG. 7.

FIG. 7 shows an example of the flutter wind tunnel test model 1 inside which columnar weights 20 are disposed. FIG. 8 is an enlarged longitudinal sectional view of the weight 20 shown in FIG. 7.

FIG. 7 shows a state where the plate members 2 simulating the skin panels of the main wing MW of the aircraft A have been detached from the flutter wind tunnel test model 1 simulating the main wing MW. That is, FIG. 7 shows a state where the non-solid structure 5 of the flutter wind tunnel test model 1 has been exposed. The density of the mesh in FIG. 7 expresses the largeness of the density of the non-solid structure 5.

As exemplified by FIG. 7, at least one weight 20 for adjusting the mass distribution may be disposed inside the flutter wind tunnel test model 1. Disposing at least one weight 20 allows locally increasing the mass of the flutter wind tunnel test model 1 according to the actual mass distribution of the main wing MW. The shape, size and material of each weight 20 can be altered freely as long as required mass can be obtained.

In the example shown in FIG. 7 and FIG. 8, the columnar weights 20 are disposed at three positions respectively. For that purpose, through holes each of which has an inner surface having no holes are partially formed on the non-solid structure 5 so that the columnar weights 20 can be fixed inside the flutter wind tunnel test model 1 by press fitting, bond with an adhesive or the like. The through holes for disposing the weights 20 can also be formed by 3D shaping. Note that, cylindrical sockets for inserting the weights 20 may be attached to the outside of the non-solid structure 5 with an adhesive. Alternatively, the weights 20 may be directly attached to end portions of the non-solid structure 5 with an adhesive.

Figure 9:
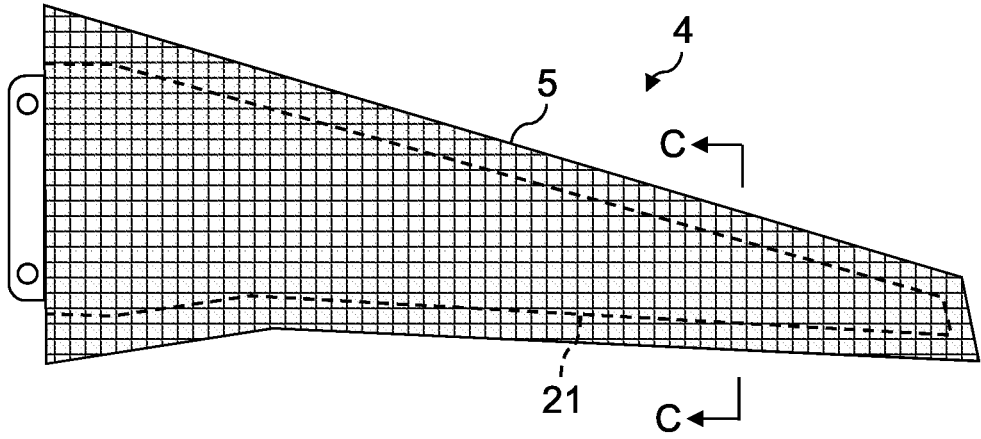
FIG. 9 shows an example of the flutter wind tunnel test model having the non-solid structure inside which a plate is disposed.
Figure 10:
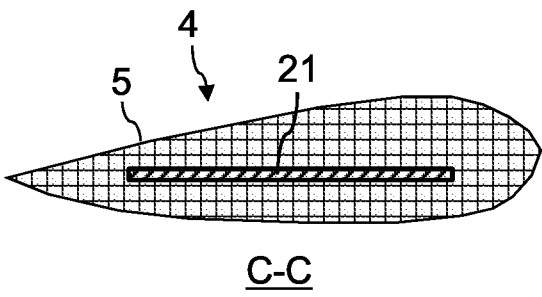
FIG. 10 is an enlarged sectional view at the position C-C of the flutter wind tunnel test model shown in FIG. 9.

FIG. 9 shows an example of the flutter wind tunnel test model 1 having the non-solid structure 5 inside which a plate 21 is disposed. FIG. 10 is an enlarged sectional view at the position C-C of the flutter wind tunnel test model 1 shown in FIG. 9.

FIG. 9 and FIG. 10 show a state where the plate members 2 simulating the skin panels of the main wing MW of the aircraft A have been detached from the flutter wind tunnel test model 1 simulating the main wing MW. That is, FIG. 9 and FIG. 10 show a state where the non-solid structure 5 of the flutter wind tunnel test model 1 has been exposed. The mesh in FIG. 9 and FIG. 10 expresses the non-solid structure 5 whose density is constant.

As exemplified by FIG. 9 and FIG. 10, the plate 21 having solid structure may also be inserted into the inside of the non-solid structure 5. In this case, the mass distribution of the flutter wind tunnel test model 1 including the non-solid structure 5 can be adjusted by changing the thickness and/or size of the plate 21. That is, the mass can be increased compared with a case where the plate 21 is not inserted since the area having the non-solid structure 5 becomes narrow by a size corresponding to the area which the plate 21 occupies.

Note that, in the example shown in FIG. 9, the end portion of the plate 21 inserted into the inside of the non-solid structure 5 is projected from the non-solid structure 5, and the projected end portion of the plate 21 from the non-solid structure 5 serves as a coupling member of the flutter wind tunnel test model 1.

As a matter of course, the material of the plate 21 may be changed. For example, when the non-solid structure 5 is produced by shaping with resin, making the plate 21 of metal allows increasing the mass and stiffness. Meanwhile, making the plate 21 of FRP, such as CFRP (carbon fiber reinforced plastics) or GFRP (glass fiber reinforced plastics), allows increasing the stiffness without enlarging the mass change. That is, changing the material of the plate 21 allows using the plate 21 as a weight or a member for increasing the stiffness.

Figure 11:
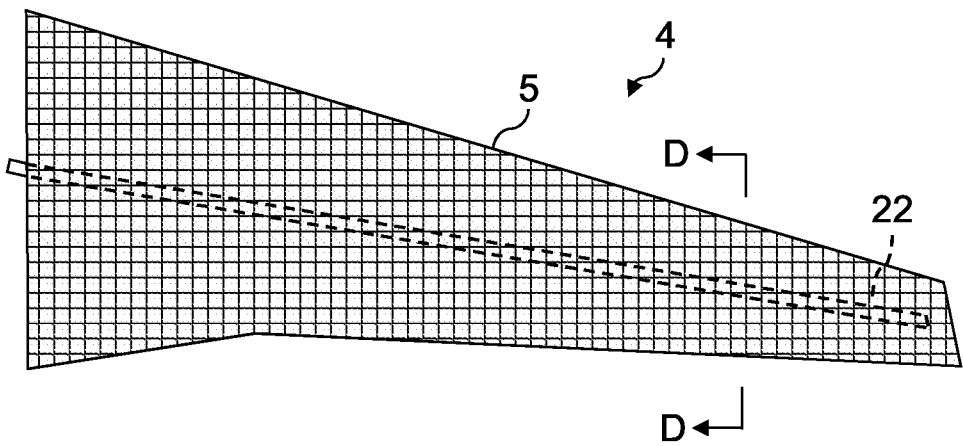
FIG. 11 shows an example of the flutter wind tunnel test model having the non-solid structure inside which a rod is disposed.
Figure 12:
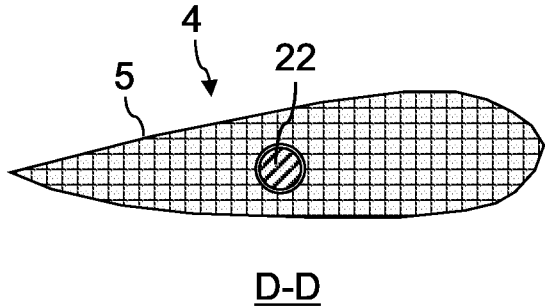
FIG. 12 is an enlarged sectional view at the position D-D of the flutter wind tunnel test model shown in FIG. 11.

FIG. 11 shows an example of the flutter wind tunnel test model 1 having the non-solid structure 5 inside which a rod 22 is disposed. FIG. 12 is an enlarged sectional view at the position D-D of the flutter wind tunnel test model 1 shown in FIG. 11.

FIG. 11 and FIG. 12 show a state where the plate members 2 simulating the skin panels of the main wing MW of the aircraft A have been detached from the flutter wind tunnel test model 1 simulating the main wing MW. That is, FIG. 11 and FIG. 12 show a state where the non-solid structure 5 of the flutter wind tunnel test model 1 has been exposed. The mesh in FIG. 11 and FIG. 12 expresses the non-solid structure 5 whose density is constant.

As exemplified by FIG. 11 and FIG. 12, at least one rod 22 may also be inserted into the inside of the non-solid structure 5 instead of at least one plate 21, or in addition to at least one plate 21. Also, as for the rod 22, the length, shape, thickness, and material can be changed freely. In particular, the cross sectional shape of the rod 22 can be changed into various shapes including an H-shape and an I-shape as well as a round shape and a polygonal shape in order to adjust only the stiffness without changing the mass.

As a matter of course, the stiffness of the plate 21 as exemplified by FIG. 9 and FIG. 10 can also be improved without substantially changing the mass by bead processing of the plate 21 and/or molding the plate 21 into a corrugated shape.

As described above, at least one of the mass distribution and the stiffness distribution of the FEM-modeled flutter wind tunnel test model 1 can be adjusted by changing all or a part of the density of the non-solid structure 5 defined in an FEM analytic model as well as creating an FEM analytic model of the flutter wind tunnel test model 1 in which at least one of one or more weights 20, one or more plates 21, and one or more rods 22 is disposed, as needed. When at least one of the mass distribution and the stiffness distribution of the flutter wind tunnel test model 1 is changed, the vibration properties of the flutter wind tunnel test model 1 also change according to the mass distribution and the stiffness distribution.

Accordingly, in step S3, a vibration analysis is again performed for the FEM analytic model of the flutter wind tunnel test model 1 of which at least one of the mass distribution and the stiffness distribution has been changed.

Thereby, the vibration properties of the FEM analytic model of which at least one of the mass distribution and the stiffness distribution has been changed are obtained. Then, in step S4, the vibration properties of the FEM analytic model are again compared with the target vibration properties of the actual aircraft part P.

These change of the FEM analytic model in step S5 and vibration analysis of the FEM analytic model in step S3 are repeated until the determination result in step S4 becomes YES, i.e., until it is determined that the vibration properties of the FEM analytic model have sufficiently approached to the vibration properties of the actual aircraft part P to an extent that it can be considered that the vibration properties of the FEM analytic model coincide with vibration properties of the actual aircraft part P.

That is, at least one of changing the density of the non-solid structure 5 totally or partially, disposing one or more weights 21, and disposing one or more members, for increasing the stiffness, inside the portion having the non-solid structure 5 can be performed at the time of designing the flutter wind tunnel test model 1, and thereby at least one of the mass distribution and the stiffness distribution of the flutter wind tunnel test model 1 can be adjusted so that the vibration properties of the flutter wind tunnel test model 1 may approach to the vibration properties of the aircraft part P.

In particular, when the non-solid structure 5 is made of resin, additionally disposing at least one solid member, such as one or more plates 21 and/or one or more rods 22, made of metal or FRP inside the flutter wind tunnel test model 1 allows increasing the stiffness of the flutter wind tunnel test model 1 to an extent that it is difficult to increase the stiffness of the flutter wind tunnel test model 1 only by changing the density of the non-solid structure 5.

As described above with concrete examples, not only the FEM analytic model has a large number of parameters for changing at least one of the mass distribution and the stiffness distribution, but each parameter could take many values. In particular, in case of partially changing the density of the non-solid structure 5, candidates of the number and shapes of divided areas are out of number. Therefore, when a target degree of coincidence between the vibration properties of an FEM analytic model and the vibration properties of the actual aircraft part P is high, the loop calculation from step S3 to step S5 becomes a complicated optimizing calculation aiming at increasing the degree of coincidence as much as possible in many cases.

Accordingly, values of parameters, such as a manner of division, density and material of the non-solid structure 5, which should certainly be determined, as well as values of parameters, such as existences and locations of weights 20, plates 21, rods 22 and the like which could be added as options, as needed, may be automatically calculated using a software for the optimizing calculation. As a matter of course, some values of parameters may be designated by a designer. Conversely, all the values of parameters may be designated by a designer.

When the determination result in step S4 becomes YES by changing at least one parameter by a designer and/or an optimizing calculation, the loop calculation from step S3 to step S5 terminates. Thereby, an ideal FEM analytic model is settled. At least a portion, including the non-solid structure 5, of the FEM analytic model is to be shaped with the 3D printer 10. Therefore, information for specifying the outline of the at least portion, including the non-solid structure 5, of the FEM analytic model is 3D shape data which should be output to the 3D printer 10.

Each element, such as the weight 20, the plate 21, or the rod 22, which is unsuitable for shaping is not produced with the 3D printer 10. Accordingly, information for shaping the non-solid structure 5 possibly having at least one cavity and/or structure for disposing at least one element, such as the weight 20, the plate 21, and the rod 22, is 3D shape data which should be output to the 3D printer 10. Moreover, when the non-solid structure 5 is divided to be shaped, 3D shape data which should be output to the 3D printer 10 are also divided.

When 3D shape data which should be output to the 3D printer 10 has been specified, the specified 3D shape data are output to the 3D printer 10, in step S6. Thereby, the portion, having the non-solid structure 5, corresponding to the shape of the FEM analytic model can be shaped with the 3D printer 10. After that, the final flutter wind tunnel test model 1 is assembled by an assembling process, as described with reference to FIG. 4. At least one element, such as the weight 20, the plate 21, and the rod 22, if any, can be attached in the assembling process.

Note that, although a case where the vibration properties of an FEM analytic model are compared with the vibration properties of the actual aircraft part P has been described with reference to FIG. 5, the mass distribution and the stiffness distribution of an FEM analytic model may be compared with the mass distribution and the stiffness distribution of the actual aircraft part P instead of the vibration properties as long as it can be considered that the same mass distribution and stiffness distribution cause equivalent vibration properties. That is, the mass distribution and the stiffness distribution of the actual aircraft part P may be set to target values, and the mass distribution and the stiffness distribution of an FEM analytic model may be brought close to the target values.

In that case, various kinds of lattice structure and/or porous structure of unit volume, each having typical mass and stiffness, may be previously obtained according to degrees of the mass and stiffness so that an FEM analytic model having a targeted mass distribution and stiffness distribution can be created by disposing the various kinds of lattice structure and/or porous structure of unit volume so as to have the targeted mass distribution and stiffness distribution.

(Effect)

The above-mentioned flutter wind tunnel test model 1 and method of producing the flutter wind tunnel test model 1 allow adjusting the density of the internal structure by adopting the non-solid structure 5, such as lattice structure, as the internal structure.

Accordingly, the flutter wind tunnel test model 1 and the method of producing the flutter wind tunnel test model 1 allow reducing a production period and production costs remarkably, compared with the case where the conventional flutter wind tunnel test model having solid structure is produced. That is, the flutter wind tunnel test model 1 can be produced easily and inexpensively using the 3D printer 10 as long as the density distribution, material and the like of the non-solid structure 5 are calculated and determined appropriately using the computer 11.

Moreover, compared with the conventional flutter wind tunnel test model having solid structure, a more appropriate mass distribution and stiffness distribution can be easily given to the flutter wind tunnel test model 1 so that deformation similar to that of the actual aircraft part P may arise on the flutter wind tunnel test model 1 due to flutter.

11 12

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A flutter wind tunnel test model simulating a shape and vibration property of an aircraft part, for a flutter wind tunnel test of the aircraft part, the model at least partially having:
   non-solid structure formed by three-dimensional printing, the non-solid structure having branched clearances inside, a volume of a portion, other than the clearances, of the non-solid structure, per unit volume being defined by density.

2. The flutter wind tunnel test model according to claim 1, wherein the non-solid structure includes at least one of lattice structure and porous structure.

3. The flutter wind tunnel test model according to claim 2, further having:
   solid structure simulating at least a portion, forming a surface which receives an aerodynamic force, out of the aircraft part, the solid structure having no clearances inside so that the aerodynamic force is applied to the solid structure in the flutter wind tunnel test.

4. The flutter wind tunnel test model according to claim 2, wherein the density of the non-solid structure is partially changed for adjusting at least one of a mass distribution and a stiffness distribution of the flutter wind tunnel test model so that a vibration property of the flutter wind tunnel test model approaches to the vibration property of the aircraft part.

5. The flutter wind tunnel test model according to claim 2, further having:
   a weight for adjusting at least one of a mass distribution and a stiffness distribution of the flutter wind tunnel test model so that a vibration property of the flutter wind tunnel test model approaches to the vibration property of the aircraft part.

6. The flutter wind tunnel test model according to claim 2, further having:
   a member, for increasing stiffness, disposed inside the non-solid structure, the member adjusting at least one of a mass distribution and a stiffness distribution of the flutter wind tunnel test model so that a vibration property of the flutter wind tunnel test model approaches to the vibration property of the aircraft part, the member including at least one of a plate and a rod.

7. The flutter wind tunnel test model according to claim 1, further having:
   solid structure simulating at least a portion, forming a surface which receives an aerodynamic force, out of the aircraft part, the solid structure having no clearances inside so that the aerodynamic force is applied to the solid structure in the flutter wind tunnel test.

8. The flutter wind tunnel test model according to claim 7, further having:
   a weight for adjusting at least one of a mass distribution and a stiffness distribution of the flutter wind tunnel test model so that a vibration property of the flutter wind tunnel test model approaches to the vibration property of the aircraft part.

9. The flutter wind tunnel test model according to claim 7, further having:
   a member, for increasing stiffness, disposed inside the non-solid structure, the member adjusting at least one of a mass distribution and a stiffness distribution of the flutter wind tunnel test model so that a vibration property of the flutter wind tunnel test model approaches to the vibration property of the aircraft part, the member including at least one of a plate and a rod.

10. The flutter wind tunnel test model according to claim 1, wherein the density of the non-solid structure is partially changed for adjusting at least one of a mass distribution and a stiffness distribution of the flutter wind tunnel test model so that a vibration property of the flutter wind tunnel test model approaches to the vibration property of the aircraft part.

11. The flutter wind tunnel test model according to claim 1, further having:
   a weight for adjusting at least one of a mass distribution and a stiffness distribution of the flutter wind tunnel test model so that a vibration property of the flutter wind tunnel test model approaches to the vibration property of the aircraft part.

12. The flutter wind tunnel test model according to claim 1, further having:
   a member, for increasing stiffness, disposed inside the non-solid structure, the member adjusting at least one of a mass distribution and a stiffness distribution of the flutter wind tunnel test model so that a vibration property of the flutter wind tunnel test model approaches to the vibration property of the aircraft part, the member including at least one of a plate and a rod.

13. A method of producing a flutter wind tunnel test model simulating a shape and vibration property of an aircraft part, for a flutter wind tunnel test of the aircraft part, the method comprising:
   shaping non-solid structure with a three-dimensional printer, the non-solid structure having branched clearances inside, a volume of a portion, other than the clearances, of the non-solid structure, per unit volume being defined by density, and
   composing at least a part of the flutter wind tunnel test model using the non-solid structure.

14. The method of producing the flutter wind tunnel test model according to claim 13, wherein at least one of a mass distribution and a stiffness distribution of the flutter wind tunnel test model is adjusted so that a vibration property of the flutter wind tunnel test model approaches to the vibration property of the aircraft part, the at least one of the mass distribution and the stiffness distribution being adjusted by at least one of partially changing the density of the non-solid structure, disposing a weight, and disposing a member, for increasing stiffness, inside the part having the non-solid structure, the member including at least one of a plate and a rod.

15. The method of producing the flutter wind tunnel test model according to claim 14, wherein the non-solid structure includes at least one of lattice structure and porous structure.

16. The method of producing the flutter wind tunnel test model according to claim 15, wherein at least a portion, forming a surface which receives an aerodynamic force, out of the aircraft part is simulated by solid structure having no clearances inside so that the aerodynamic force is applied to the solid structure in the flutter wind tunnel test.

17. The method of producing the flutter wind tunnel test model according to claim 14, wherein at least a portion, forming a surface which receives an aerodynamic force, out of the aircraft part is simulated by solid structure having no clearances inside so that the aerodynamic force is applied to the solid structure in the flutter wind tunnel test.

18. The method of producing the flutter wind tunnel test model according to claim 13, wherein the non-solid structure includes at least one of lattice structure and porous structure.

19. The method of producing the flutter wind tunnel test model according to claim 18, wherein at least a portion, forming a surface which receives an aerodynamic force, out of the aircraft part is simulated by solid structure having no clearances inside so that the aerodynamic force is applied to the solid structure in the flutter wind tunnel test.

20. The method of producing the flutter wind tunnel test model according to claim 13, wherein at least a portion, forming a surface which receives an aerodynamic force, out of the aircraft part is simulated by solid structure having no clearances inside so that the aerodynamic force is applied to the solid structure in the flutter wind tunnel test.

* * * * *